Figure 1:
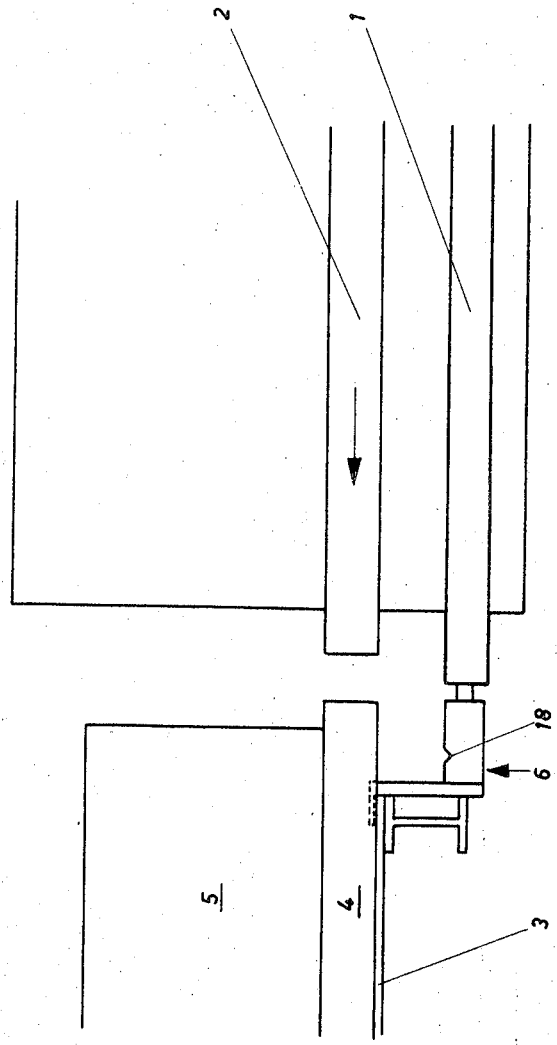

United States Patent [19]
Suter

[11] 3,822,766
[45] July 9, 1974

[54] PROCESS AND A DEVICE FOR THE FINE POSITIONING OF A VERTICALLY MOVABLE PLATFORM IN FRONT OF A PALLET LOCATION

[75] Inventor: Walter Suter, Buchs, Switzerland

[73] Assignee: Oehler-Wyhlen-Lagertechnik AG, Aarau, Switzerland

[22] Filed: July 19, 1972

[21] Appl. No.: 273,143

[30] Foreign Application Priority Data
July 20, 1971 Switzerland.................... 10775/71
Aug. 11, 1971 Switzerland.................... 11836/71

[52] U.S. Cl............................................ 187/29 R
[51] Int. Cl............................................ B66b 1/40
[58] Field of Search ............... 187/29; 318/466, 480

[56] References Cited
UNITED STATES PATENTS

| | | | |
|---|---|---|---|
| 3,036,256 | 5/1962 | Purdy.................................. | 318/480 |
| 3,119,501 | 1/1964 | Lemelson............................ | 187/29 X |
| 3,138,357 | 6/1964 | Whitwell et al.................. | 318/480 X |
| 3,486,640 | 12/1969 | Lemelson.......................... | 187/29 X |

*Primary Examiner*—Robert K. Schaefer
*Assistant Examiner*—W. E. Duncanson, Jr.
*Attorney, Agent, or Firm*—Stepno, Schwaab & Linn

[57] ABSTRACT

A process for automatically positioning a platform in front of a pallet location to effectuate the deposit or removal of a palletized load therein which is accomplished by moving the platform to an approach position above the floor of the pallet location, actuating sensing means disposed on said platform after the approach position is reached, lowering the platform thereby causing the sensing means to compare the distance traversed by the downwardly moving platform in relation to the pallet location with a predetermined reference distance to and when such distances are equal the sensing means causes the drive motor for said platform to stop. The sensing means disclosed may be either an electromechanical device which is extended from its recessed position within the platform to a working position and has a tongue member attached to a pivotal portion of the device which engages the pallet floor and operates switching means controlling the movement of the platform or the device may be a photoelectric scanner comprised of a transmitter which emits a focused light beam, e.g., a microlaser, and a receiver which receives the reflected beam from the pallet floor through an adjustable aperture in front of the receiver.

18 Claims, 5 Drawing Figures

PROCESS AND A DEVICE FOR THE FINE POSITIONING OF A VERTICALLY MOVABLE PLATFORM IN FRONT OF A PALLET LOCATION

It is known that one source of technical problems in high-bay storage with fully automatic control of the conveying means, for example, is that the pellets being put into or removed from storage are made of wood and have relatively wide manufacturing tolerances, and that the dimensions of these pellets can change in the course of time through use, wear, working of the wood, etc. Further complications in such bay storage stem from the fact that economic considerations prevent the individual bay units from being built with exaggerated dimensional accuracy and that they can shift out of their proper positions as a result of settling or external factors such as wind pressure, differences in thermal stressing, etc. Particularly in the case of warehouse of considerable length or height, these factors accumulate to such an extent that proper functioning of the automatic control of the conveying means can become highly questionable.

It has already been proposed that square pieces of light-reflecting foil be mounted on each pallet location as positioning markers and that these be scanned by four points of light emitted by optical transmitters on the lifting carriage. This made it possible to detect the precise momentary position of the pallet location, but this advantage was offset by the fact that the optical scanning system gave rise to more malfunctions and also required substantially more maintenance in order to counteract contamination of or damage to the relatively largesurfaced, light-reflecting foils. Moreover, this optical scanning usually necessitates a conversion of the signal provided by a photoelectric cell, and can only be applied in a trial-and-error procedure with corresponding loss of time.

Further, the optical procedures, employed to date are no longer operable, in cases where a smaller, local fire results in heavy smoke. But that is precisely the moment when it would be especially desirable to remove the goods in the neighbourhood of the fire with remote-controlled conveying means in order to prevent the fire from spreading.

In the known systems, further malfunctions occurred when the illumination density was altered by additional light effects.

The purpose of the present invention is to propose a new process by which an individual pallet location can be approached precisely, reliably and without loss of time. According to the process of the invention, the platform is run in an initial approach to a position lying above the target position, whereupon the position of the pallet location being approached is scanned and the distance between a reference point on the platform and a reference point on the pallet locations is determined; finally, the platform is displaced vertically until this distance equals a preset reference value.

A first possible embodiment of this process consists in accomplishing a mechanical scanning of the position of the pallet location by means of a movable, extandable sensor, whereby, after the tip of the sensor has contacted the pallet location, the platform can be displaced until the sensor has reached a predetermined position relative to the platform.

One suitable device for implementing this process comprises a sensor attached to the platform and projecting horizontally from it in the extended working position, the path of movement of said sensor lying within reach of a part of the pallet location acting as a stop, whereby at least one part on the tip of the sensor is movable in the vertical direction and is connected to at least one switching element which influences the drivin means of the platform.

A second embodiment can consist in the scanning of the pallet location with modulated light in the infrared band, said light being emitted by a transmitter arranged on the platform, reflected from a predetermined point on the pallet location and received by a receiver arranged on the platform in a certain position of the platform opposite to the pallet location, whereby the receiver directly influences the movement of the platform.

A device suitable for implementing this second possibility comprises a transmitter arranged on the platform for emitting modulaled light in the infrared band, and a receiver also arranged on the platform at a distance from the transmitter, said receiver only receiving the reflected beams of the transmitter within a certain angular range.

It can be of advantage to install the receiver directly in the control circuit which directs the movement of the platform.

It is particularly advantageous for the receiver to include silicon diodes, which respond with special sensitivity to infrared waves and which can be employed as switching elements in the control circuit.

The proposed process possibilities will now be explained in detail with reference to the accompanying drawings of embodiments of the proposed device.

Figure 2:
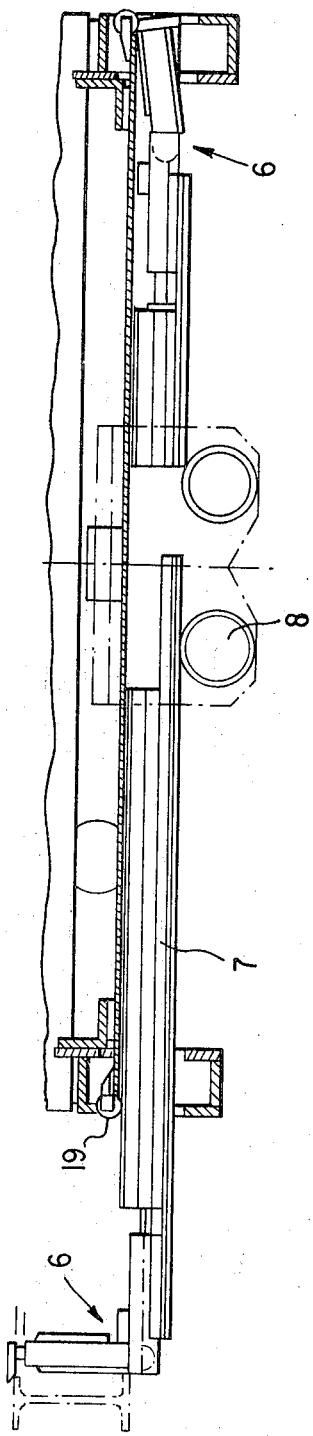
Figure 3:
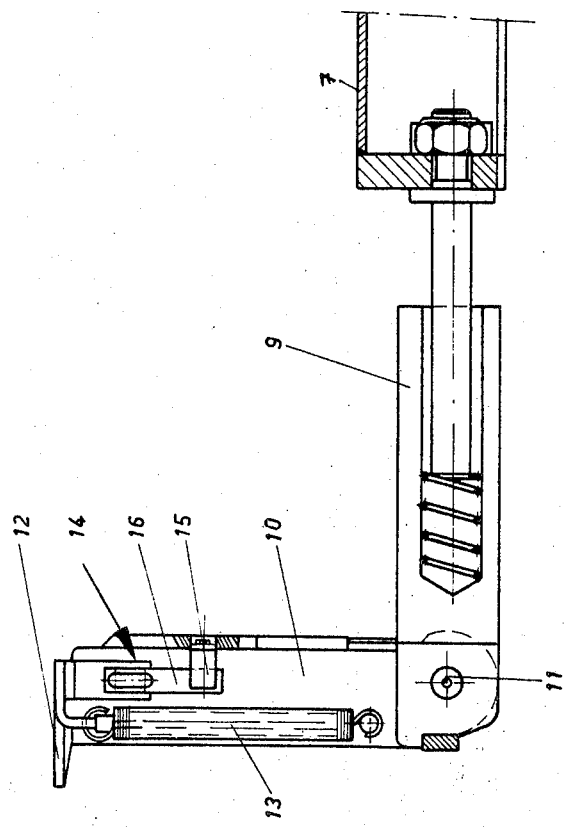
Figure 4:
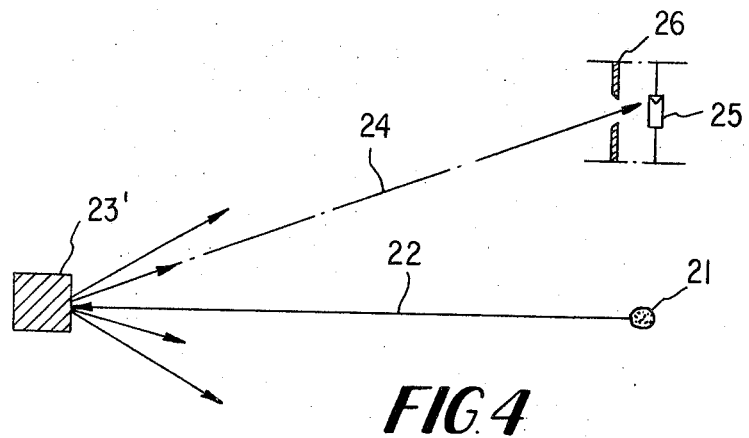

Shown are:

FIG. 1 the diagrammatic arrangement of the first embodiment example,

FIG. 2 a lifting platform with built-in fine positioning device,

FIG. 3 a section through the sensor shown in FIG. 1,

FIG. 4 a diagrammatic sketch of the second possible embodiment

Figure 5:
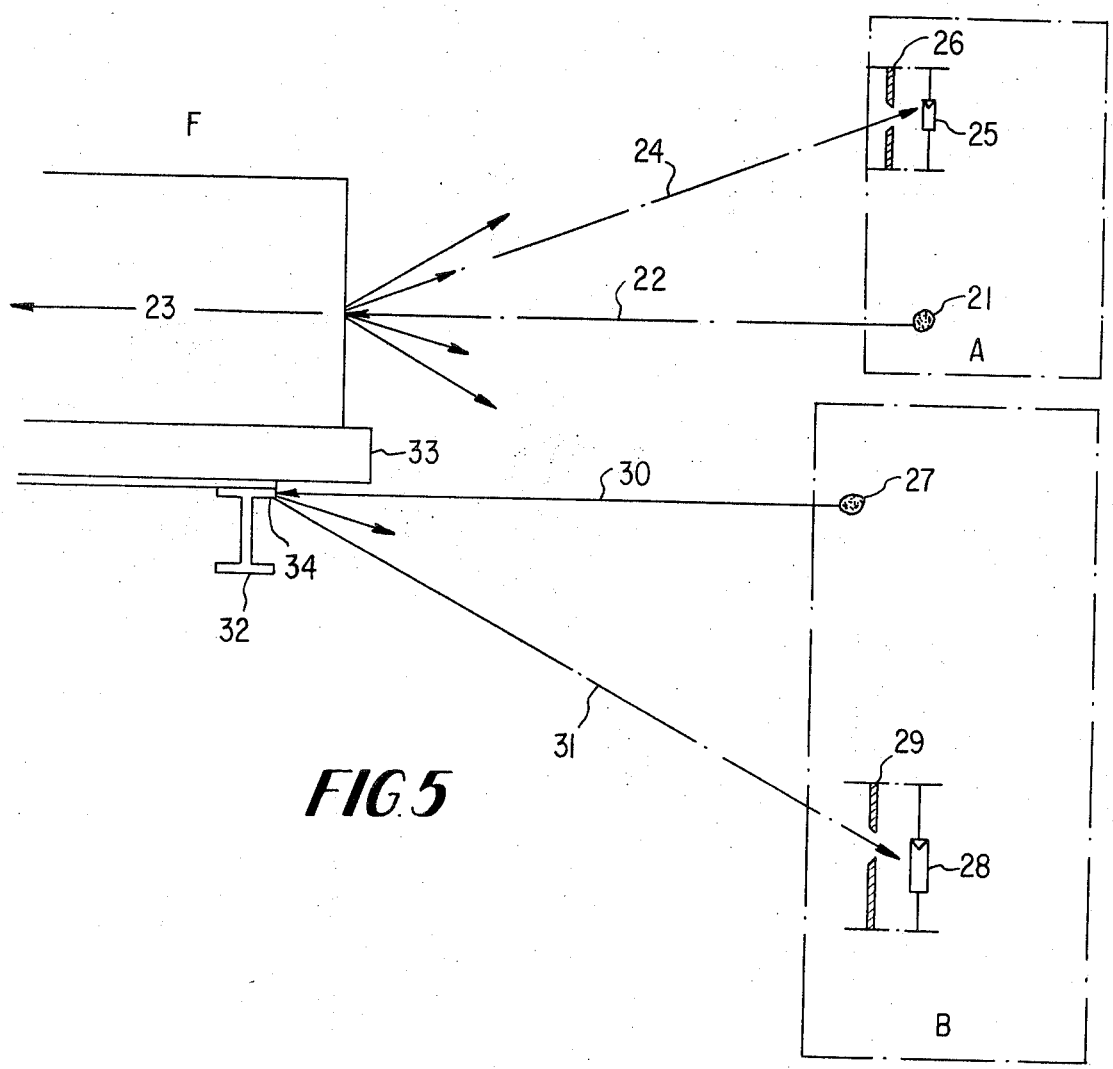

FIG. 5 a diagrammatic embodiment.

The essential parts of a storage bay are shown diagrammatically in FIG. 1. Platform 1, which can be movable up and down in a transfer tower not shown, is provided with a telescoping fork 2 which can be raised a small amount and can be moved horizontally in the direction of the arrow. The material 5 being stored is supported by a pallet 4, which rests on the floor 3 of a pallet location. A sensor 6, shown in FIG. 1 in its extended working position, is attached to the side of platform 1 which faces the pallet location. As can be seen in FIG. 2, this sensor 6 is fastened to toothed rack 7 which can be moved horizontally by a gear motor 8 shown diagramatically. The right-hand part of FIG. 2 shows the sensor head 6 in the withdrawn position it assumes during normal travel. In this position it is completely recessed in the platform and cannot strike any projections along the path of the platform. The left-hand part of FIG. 2 shows the sensor in the extended working position it assumes while approaching the target position.

The detailed configuration of the sensor 6 is illustrated in FIG. 3. It comprises a first part 9 which is coupled elastically with the rack 7 and which assumes an essentially horizontal position. A second part 10 is attached to the first part 9 in that it can pivot about an axis 11; in the extended working position of the sensor 6 it stands perpendicular to part 9. In the withdrawn rest position, on the other hand, the part 10 assumes a virtually horizontal position, as can be seen in FIG. 2. The upper end of part 10 is provided with a sensing tongue 12, which is mounted in part 10 so that it can be shifted horizontally and which is acted upon by a spring 13 which draws this tongue 12 toward the end face of the part 10.

Coupled with the tongue 12 is a switching element 14, which can, for example, consist of a slot initiator. Such an element comprises a coil 15 and a metal strip 16 reaching into the air gap of the coil. In this arrangement, the coil 15 is displaceable within the part 10 of the sensor 6 and can be locked in place, while the metal strip 16 is connected to the tongue 12 and is therefore movable as well.

This device functions as follows. The platform should be run to a full pallet location and the goods stored therein should be removed and carried off by the platform. An automatically functioning control system serves to move the platform 1 into an approach position somewhat above the target pallet location 3. During the last portion of the travel of the platform 1, the previously withdrawn sensor 6 is extended by means of the gear motor 8, so that, when this approach position is reached, part 10 of the sensor 6 will butt against the front edge of the target pallet location 3. Now the platform 1 is lowered agains slowly, whereby the tongue 12 comes to rest on the upper edge of the bay and thus is drawn out of part 10 of the sensor 6 to the same degree. This draws the metal strip 16 more and more out of the air gap of the coil 15, until it finally leaves the coil completely, whereupon the inductance of the coil undergoes a sudden change. This change is inductance is employed as stop signal for the driving means of the platform 1, whereby of course the position of the coil 15 is adjusted beforehand so that the precise target position of the platform is reached the instant the metal strip 16 leaves the air gap. Hence the telescoping form 2 can be extended fully to pick up the goods to be removed.

According to a modification, a further coil 15' and a further metal strip 16' can be provided as well. This second metal strip 16' is shaped somewhat longer and is likewise connected to the tongue 12. At the instant when the first metal strip 16 leaves the air gap of the coil 15, because the tongue 12 has come to rest on the bay and is withdrawn, the second metal strip 16' still remains within the air gap of its associated coil 15'. In this condition, the desired target position is reached. Should the platform be lowered too far for one reason or another, however, the second metal strip 16', also leaves the air gap of its associated coil 15', and this causes the platform to be raised.

Thus the two switching elements 15, 16 and 15', 16' can supply the platform control system with three different pieces of information:
  both strips in air gaps, means: platform too high
  strip 16 withdrawn,
  strip 16' in air gap, means: platform correctly located both strips withdrawn, means: platform too low.
A switch 19 is provided in the neighbourhood of the extandable rack 7 which limits the outward travel of the rack. Thus the sensor as a whole is attached elastically to the rack and, in its fully extended position, butts against the front edge of the bay with a certain pressure.

Another embodiment is illustrated in FIGS. 4 and 5.

In FIG. 4, 21 represents a transmitter with which a focussed light beam 22 in the infrared band is generated. The transmitter used can be, for example, a microlaser which emits a modulated beam that is largely insensitive to external light. The light beam 22 even penetrates clouds of smoke and spray fog without significant impairment. This light beam 22 strikes an object 23 and shown on it as a spot of light; the reflection is diffuse. Hence no special reflecting surface is required. Arranged a predetermined distance away from the transmitter 21 is a receiver 25 in the form of a photodiode, which can only receive reflected beams 24 within a certain angular range. 26 represents an adjustable aperture placed in front of the photodiode 25; this aperture can be used to delimit still more precisely the direction of the reflected beam. Hence the adjustable visibility range of the receiver 25 makes it possible to establish the distance within which objects can be located with the beam 22.

In the practical application of the described system, it is advantageous to use two scanning devices, whereby the second device permits the additional determination of whether the target pallet location is full or empty. This improves still further the reliability of the storing and removal procedure.

Hence FIG. 5 shows a scanner group A and a scanner group B arranged on the lifting platform, whereby the group B is offset in relation to group A both in the height and laterally in order to prevent light-beam interference.

The scanner group A corresponds to the device illustrated in FIG. 4 and described above, with transmitter 21 and light beam 22, the latter striking the object 23 in pallet location F. When the platform is in a certain position, the reflected beam 24 penetrates the adjustable aperture 26 and reaches the photodiode 25. This device establishes whether the bay F is full or empty. Only when the pallet location is full can the beam 22 be reflected in such a way that part of the reflected beams penetrate the aperture 26 to reach the photodiode 25.

The scanner group B makes possible the fine positioning of the platform and also comprises a transmitter 27 and a receiver 28 in the form of a photodiode behind a adjustable aperture 29.

If the platform is to be run to a full pallet location F and the goods therein are to be removed and carried away, the platform is first moved by an automatically functioning control system into an approach position somewhat above the target pallet position F. During the last portion of the travel of the platform, the scanner group B is switched on and the platform is lowered again slowly. The infrared beam 30 emitted by the transmitter 27 was originally directed toward the empty cavity under the pallet 33; it then strikes the edge 34 of the beam 32, whereby the resulting spot of light is picked up by the receiver 27. As the platform is lowered further the spot of light disappears suddenly, so that the beam 30 is no longer reflected. Thus the previously reflected beam 31 disappears, providing a signal in the receiver 28 which is utilized to halt the platform movement. The position of the receiver 28 is chosen so that the target position of the platform is reached precisely when the reflected beam 31 disappears. In this position the goods to be removed can be picked up and taken out of the pallet location F.

According to a modification not illustrated, a further photodiode can be arranged as receiver below the aperture 29, somewhat offset. If neither of the photodiodes receives signal light, the platform is still too high. If the receiver 28 receives signal light but the additional photodiode still receive none, the platform is still too high but the receiver 28 prepares the circuit for halting. If the signal light disappears at the receiver 28 and the additional photodiode does not yet receive a signal, the position of the platform is correct and its movement is interrupted instantly. Finally, it can occur that the signal light disappears at the receiver 28 and the additional diode receives light. In this case the platform is located too low because the desired target position has been passed. During the subsequent upward movement, the platform is halted when the signal light disappears at the additional diode and no signal light has yet reached the receiver 28.

The invention is not intended to be restricted to the embodiments described, since still other arrangements and circuits are possible. Thus, for example, the microlaser can be replaced by an infrared lamp with convergent lens, whereby the light is modulated by a rotating slotted disk. Moreover, phototransistors can be employed instead of photodiodes. Another type of transmitter which could be used is a gallium arsenide diode which generates an infrared carrier wave with a wave length of about 0.9 microns, which is focussed by a telescope optical system.

The proposed process and the device described make it possible for the platform to assume an optimum position relative to the target pallet location in every case before the means for picking up the load are run into the location. It makes no difference, for example, if a heavily loaded location has sunk somewhat, since the sensor detects the precise position of the upper edge of the pallet location floor from case to case. This also takes into account any tolerances in the dimensions of the bays, so that reliable operation of the automatic control system without time loss is assured.

What I claim is:

1. A process for the fine positioning of a movable platform in front of a pallet location, comprising the steps of
   a. vertically moving said platform to an approach position slightly above the floor of said pallet location by means of an automatic control system,
   b. actuating non-reflector mediated sensing means on said platform after said approach position is attained,
   c. lowering said platform and said sensing means,
   d. comparing the distance traversed by the downwardly moving platform with respect to a reference point on said pallet location with a predetermined reference distance associated with said sensing means, and
   e. causing said platform to move vertically in response to a signal from said sensing means until the distance traversed by said platform is equal to said predetermined reference distance whereby the movement of said platform is stopped and said platform is positioned directly opposite said pallet location.

2. The process as defined by claim 1, wherein said actuating step comprises moving an extendible mechanical sensor from recessed position within said platform into an operative position, and the comparison step comprises contacting an extensible sensing tongue situated at the distal end of said extensible sensor with the floor of the pallet location and displacing said platform vertically thereby causing said tongue to move relative to said sensor until the distance said tongue traverses equals a predetermined reference distance.

3. The process as defined by claim 1, wherein said actuating step comprises activating a transmitter which emits a modulated collimated light beam and said comparing step comprises focusing said light beam on said pallet location as said platform is lowered from the approach position thereby causing said beam to be reflected from the reflectorless floor of the pallet location and to be received by a receiver on said platform, said reflected beam being received only within certain preset angular ranges corresponding to predetermined distances between said platform and said pallet floor whereby the relative distance traversed by the platform with respect to the pallet can be compared with a predetermined reference distance and the movement of said platform stopped in response to a signal from said receiver.

4. A device for the fine positioning of a vertically movable platform in front of a pallet location, comprising a mechanically operated sensing assembly horizontally movable from a recessed position within said platform to an extended working position, said sensing assembly including a first part coupled to a first driving means within said platform for moving said assembly into the working position, a second part pivotally secured to said first part and movable to a position generally perpendicular with respect to said first part, tongue means projecting from said second part and extensibly movable with respect thereto for disengageably contacting a portion of said pallet location, and switching means connected to said tongue means for influencing a second platform driving means.

5. The device as defined by claim 4, wherein a portion of said tongue means is disposed within said second part and attached to a spring the opposite end of which is secured to the inside of said second part.

6. The device as defined by claim 5, wherein said tongue means is connected to at least one switch disposed within said second part of said sensing assembly, said switch being actuated when said tongue means contacts said pallet location and is vertically displaced a predetermined distance from said second part.

7. The device as defined by claim 6, wherein said switch comprises an inductively functioning slot initiator generally comprising a coil and a metal strip reaching into the air gap of said coil.

8. The device as defined by claim 7, wherein said tongue means is connected to two inductively functioning slot initiators, the metal strips of which are of different lengths.

9. A device for the fine positioning of a platform in front of a pallet location, comprising a transmitter arranged on the platform for emitting a modulated collimated light beam in the infrared band, means directing said light beam toward said pallet location, receiving means arranged on the platform at a distance from said transmitter for receiving beams reflected from nonreflector surfaces on said pallet location, said receiving means being adjustable to delimit the light received to that which is reflected within certain predetermined angular ranges and being responsive to the absence of such reflected light for causing fine positioning of said platform with respect to said pallet location.

10. The device as defined by claim 9, wherein said receiver electrically cooperates with a control circuit for directing movement of said platform.

11. The device as defined by claim 9, wherein the receiving means comprises silicon diodes which respond with specific sensitivity to infrared waves, said diodes being part of a control circuit which directs the movement of said platform.

12. The device as defined by claim 9, wherein said transmitter comprises a micro-laser which is pulsed at short intervals to modulate the light beam emitted thereby.

13. The device according to claim 9, wherein said receiving means includes an aperture for limiting the light beam received by said receiving means to that which is reflected onto said receiving means at a predetermined angle of incidence.

14. The device as defined by claim 9, wherein said transmitter and said receiving means cooperate to define a first scanner group, and further including a second scanner group, said second scanner group comprised of a second transmitter and a second receiving means arranged on said platform, said scanner groups being in offset relationship with respect to each other both in the vertical and horizontal aspects thereby preventing interference between the separate light beams emitted from each respective transmitter and the light beams received by the respective receiving means.

15. The device as defined by claim 14, wherein the receiving means of one of said scanner groups causes the platform to stop when a reflected beam incident on said receiving means ceases to strike said receiving means as a consequence of a change in the angle of incidence of said reflected beam.

16. The device as defined by claim 14, wherein one of said scanner groups further comprises an additional photodiode acting as an additional receiving means arranged such that a reflected light beam is received by the respective receiving means of said scanner group serially as the platform is vertically displaced, said receiving means cooperatively influencing the movement of the platform with respect to the pallet location and causing said platform to stop when the reflected light beam is no longer incident upon either one of the receiving means of said one scanner group.

17. The device according to claim 9, wherein said transmitter comprises an infrared lamp with a convergent lens and a rotating slotted disk which modulates the light emitted from said lamp.

18. The device according to claim 9, wherein said transmitter comprises a gallium arsenide diode generating an infrared carrier wave having a wavelength of approximately 0.9 microns and focused by a telescope optical system.

* * * * *